March 31, 1931.  L. J. GRUBMAN  1,798,155
METHOD AND MEANS FOR ASSEMBLING THE PARTS OF DOLL EYE SETTINGS
Filed Dec. 21, 1928  2 Sheets-Sheet 1
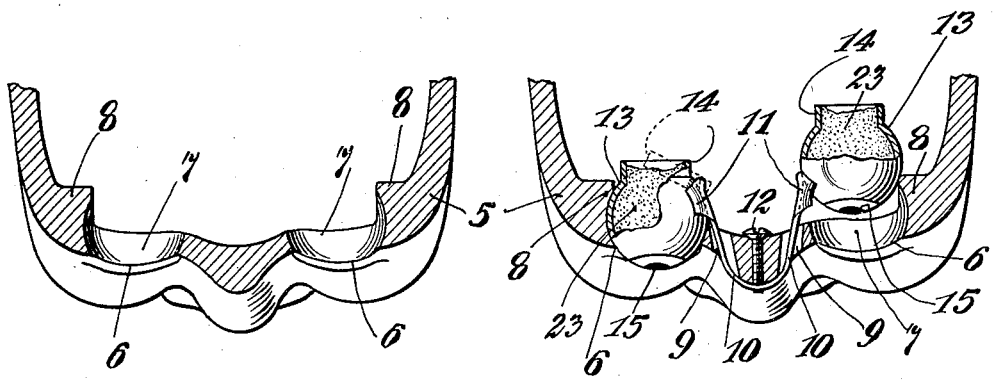
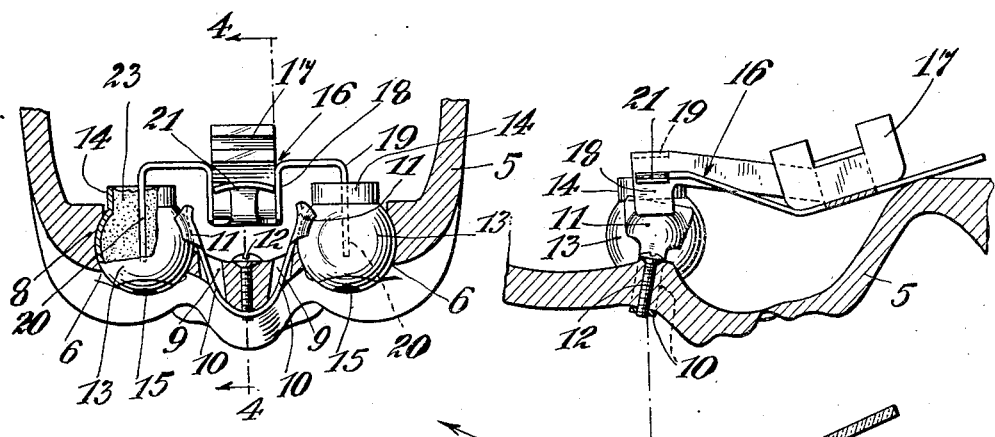
Inventor
Leo J. Grubman
By his Attorney Inventor
Leo J. Grubman
By his Attorney Patented Mar. 31, 1931

1,798,155

UNITED STATES PATENT OFFICE

LEO J. GRUBMAN, OF BELLE HARBOR, NEW YORK

METHOD AND MEANS FOR ASSEMBLING THE PARTS OF DOLL-EYE SETTINGS

Application filed December 21, 1928. Serial No. 327,606.

This invention relates to an improved method and means for assembling the parts of doll eye settings, and has for its general object and purpose to provide a new method of assembling artificial glass eye members and securing the same to spaced parts of the eye setting whereby said eye members may be interchangeably mounted in doll heads produced from the same mold with the centers of the eye pupils positioned in accurate relation to the respective eye openings in the wall of the doll head.

The essential features of my new method consist in first arranging the hollow glass eye members having rear open ends in spaced sockets formed in the wall of a model head section exactly conforming to the mold from which the doll heads are produced, then independently adjusting said eye members in the sockets so as to position the eye pupils of said members in proper relation to the edges of the spaced eye openings at the outer side of the head wall, each of said eye members being filled with a cementitious or thermoplastic material, then inserting spaced parts of the weighted frame or pendulum of the eye setting into the rear ends of the eye members and embedding the same in said material while said eye members are held in their adjusted positions in the respective sockets. In this manner, the two eye members are properly fixed in spaced relation to each other and with relation to the axis of oscillation of the eye setting when subsequently mounted in a molded doll head. In the use of glass eye members in connection with such settings, any attempt to adjust the eye members relative to the setting after they have been attached to the latter in order that the eye pupils thereof shall be accurately centered relative to the openings in the doll head wall to which the device is applied, is likely to result in the breaking of the eye members which are comparatively fragile and delicate. This possibility will be obviated by means of my new method since the eye members are initially adjusted in the sockets of the model head prior to their attachment or connection with the weighted frame of the setting so that no further subsequent adjustment of said eye members will be required.

It is also another object of my invention to provide means for facilitating such assemblage of the parts of the eye setting including spring means on the model head section to engage the spaced glass eye members and yieldingly hold the same in their adjusted positions in the spaced sockets. In one form of the invention, I may further provide the model head section with means for locating or positioning an axis of the weighted frame or pendulum with respect to the eye members positioned in the spaced sockets so that when said axis is subsequently mounted on the wall of the doll head, it will bear the same relation to the sockets of said head wall and thus insure the free turning or oscillating motion of the eye members.

With the above and other objects in view, the invention consists in the improved method and means for assembling the parts of doll eye settings, and in the several novel features thereof as will be hereinafter more fully described, illustrated in the accompanying drawings and subsequently incorporated in the subjoined claims.

In the drawings, wherein I have disclosed several different forms of the means or apparatus for carrying out my new method, and in which similar reference characters designate corresponding parts throughout the several views, Figure 1 is a transverse sectional view of a model head section having the eye openings and the spaced eye member receiving sockets in exactly the same relation to each other and to the facial features of the head wall as in the mold from which the manufactured doll heads are formed;

Fig. 2 is a similar view showing this model head provided with the means for holding the eye members in adjusted positions and showing the glass eye members, one of which is about to be inserted into one of the eye sockets;

Fig. 3 is a similar transverse sectional view illustrating the final step of anchoring or securing the spaced parts of the weighted frame of the eye setting within the hollow eye members;

Fig. 4 is a longitudinal sectional view taken substantially on the line 4—4 of Fig. 3;

Figure 5:
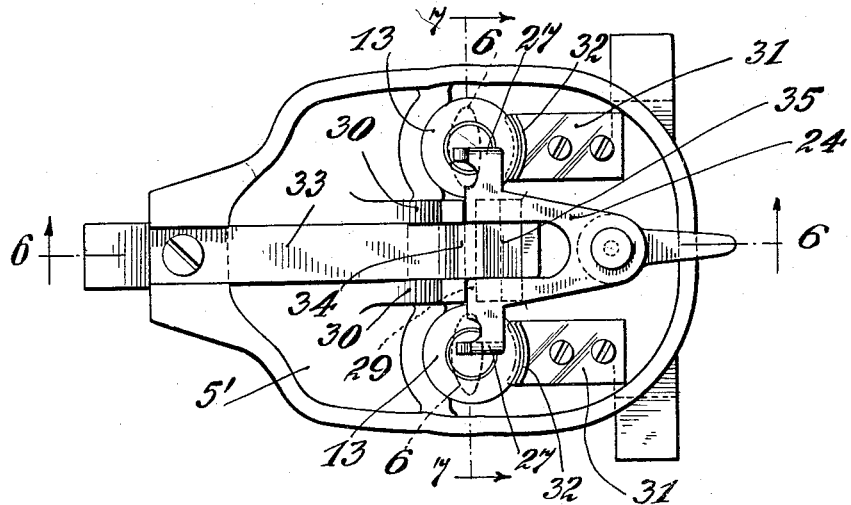
Fig. 5 is a plan view of a slightly modified form of the apparatus for use in assembling the parts of another type of eye setting.

It has long been recognized in the art that in the manufacture of the sleeping type of doll having moving or oscillating eyes, the most natural and realistic effect can be obtained only by the use of eye members of glass. However, such glass eye members have heretofore been used only in the most expensive dolls owing to the difficulty first in attaching these glass eye members to the metal frame parts of the eye setting, and secondly, in fitting these eye members into the spaced sockets of the doll head wall so that the centers of the eye pupils applied to the surfaces of said members will move in accurate relation to the openings in the head wall at the outer surface thereof. Attempts to adjust these spaced eye members relative to each other after their attachment by bending the metal parts of the frame frequently resulted in the breakage of said eye members, the walls of which are comparatively thin.

I have devised a method of easily and quickly attaching such glass eye members to the metal frame parts and positioning the pupil centers on to said spaced eye members in proper relation to each other so that when the setting is subsequently mounted in the doll head, said pupil centers will be accurately related to the respective eye openings without requiring any additional relative adjustment. To this end, I employ certain apparatus including a model head section generally indicated at 5 which is an exact replica as to its cross sectional conformation and the arrangement of the eye member receiving sockets with respect to each other and relative to the facial features of the doll head, of the manufactured or molded doll head to which the eye setting is to be applied. In the structure of this model head section shown in Fig. 1 of the drawings, the eye shaped openings 6 at the outer surface of the head wall are arranged in the usual spaced relation at opposite sides of the nose and the major axes of these openings may possibly be out of alignment with each other due to inaccuracies in the mold from which the head section is formed. The wall of said head section at the inner side of each of the eye openings is milled out to provide a concave seat or socket 7, and at the outer end of each eye opening, the wall of the head section is thickened as indicated at 8 so that the portion of the socket which is milled in this thickened part 8 is relatively wide and extends rearwardly of the remaining portion of the socket to provide a comparatively extensive bearing surface for the eye member.

As shown in Fig. 2 of the drawings, at each side of the nose ridge of the doll head section, an opening 9 is cut through the wall thereof through which the arms of a substantially U-shaped spring metal strip 10 are disposed and project rearwardly beyond the inner surface of the head wall, said arms terminating in concavo-convex bearing seats 11. The central portion of the member 10 is securely fixed upon the surface of the nose ridge formation by means of a suitable screw indicated at 12. Normally the parts 11 of the member 10 project over the inner sides of the sockets 7 so that in order to insert the eye members into said sockets, it is first necessary to spring the spaced arms 10 inwardly towards each other.

The eye members as herein shown, each consists of a hollow glass ball or sphere 13 having a rearwardly extending open neck 14 of large diameter. The eye pupil indicated at 15 is suitably applied to the inner or outer surface of the glass wall of the eye member in more or less axially centered relation with the neck extension 14. However, it is not uncommon for these pupil centers to be positioned in eccentric relation to the axial center line of the eye member, due to carelessness in their application. Under my new method however, this is not of material consequence, since the neck extensions 14 do not have any direct bearing contact with the metal frame of the eye setting and therefore, do not determine the positions of the eye pupils with respect to the eye openings of the doll head wall.

This metal frame of the eye setting generally indicated at 16 may be of various constructions. In the form illustrated in Figs. 3 and 4 of the drawings, said frame consists of a sheet metal stamping having suitable provision for the attachment of a pendulum weight indicated at 17 and provided with spaced resiliently yieldable arms 18 terminating at one of their ends in the lateral U-shaped bends 19, one branch or arm 20 of each of these bends being relatively long. The arms 18 normally tend to spring apart or outwardly away from each other and the metal frame also includes a resiliently movable spacer 21 normally positioned between the ends of these arms to prevent their inward movement towards each other.

In the attachment of the eye members to the metal frame of the eye setting, the eye members are first inserted into the respective eye sockets 7 of the model doll head section 5 as seen in Fig. 2 of the drawings, the holding parts 11 of the member 10 being sprung inwardly towards each other sufficiently to permit of the insertion of the eye members with their spherical surfaces in engagement with the concave walls of the eye sockets. The operator then adjusts the individual eye members until the centers of the eye pupils 15 exactly coincide with the point of intersection of the major and minor axes of the respective eye openings 6 in the wall of the head 5. In order to facilitate this operation and to permit the relation between the eye pupils and the openings 6 to be easily observed by the operator, I preferably arrange below the head section 5 an inclined mirror or other reflector as indicated at 22 in Fig. 4 of the drawings. The outer surface of the doll head 5 and the changing positions of the eye pupils 15 relative to the openings 6 as the eye members are adjusted by the operator may thus be easily observed by the operator without altering the position of the head 5.

Either before or after the adjustment of the respective eye members, a cementitious or thermo-plastic material indicated at 23 may be poured into each eye member through the rear open end thereof. After the eye members have been properly adjusted to center the pupils 16 relative to the eye openings 6, the branches 20 of the U-shaped parts 19 of the frame of the eye setting are then inserted through the rear ends of the respective eye members and embedded in the material 23. After this material has become hardened or set, the parts 20 of the eye setting will be firmly anchored in said material which also completely fills the interior of the hollow eye shell and adhesively unites with the inner surface of the shell wall. Thus, any possibility of angular shifting or turning movement of the individual eye members relative to the parts 20 of the eye setting frame is obviated.

It will be noted that in this form of eye setting, the setting has no physical axis other than the contact of the spherical surfaces of the eye members 13 with the walls of the eye sockets 7. When this eye setting with the eye members attached in the manner above described to the metal frame is subsequently mounted in a manufactured doll head the front wall of which has identically the same cross sectional form as the model head section 5, the two eye members will be urged apart by the resiliently acting sections 18 of the metal frame 16 to hold said eye members with their outer sides in rocking contact with the relatively wide outer side portions of the respective eye sockets 7 and whereby said eye members will thus be held against a rearward movement relative to the doll head wall, owing to the provision of the spacer 20 of the frame of the setting which effectually prevents any possibility of inward movement of the spaced eye members towards each other.

Thus, the eye members are supported for rocking movement entirely by the walls of the eye sockets, and of course the pupils 15 thereof will assume identically the same relation to the respective eye openings of the manufactured doll head as when these eye members are initially adjusted in the sockets of the model head sections 5 and attached to the frame of the eye setting. Therefore, in the oscillation of the eye setting and the rocking movement of the individual eye members in the respective sockets, the centers of the eye pupils will move in accurate relation to the eye openings 6, even though there may be certain variations in the form or shape of the eye openings, and though the centers of the eye openings may be out of alignment with each other.

From the foregoing, it will be evident that by means of my new method of attaching the glass eye members to the metal frame of the eye setting, such attachment may be easily and quickly made and the eye settings are interchangeable in different doll heads produced from the same mold, and without requiring any subsequent relative adjustment of the eye members, and with the assurance of an absolutely accurate relation between the pupil centers of the individual eye members and the respective eye openings in the wall of the doll head.

Figure 6:
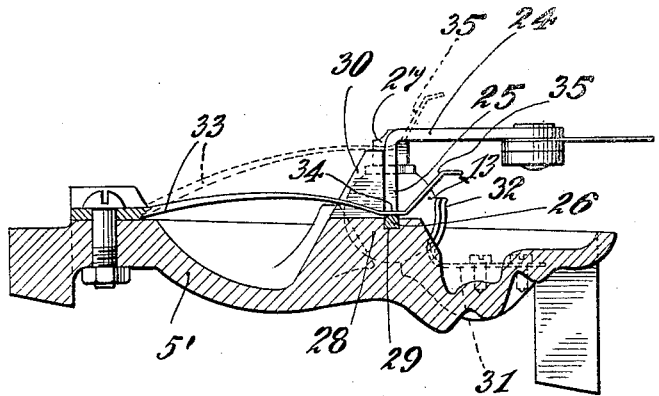
Fig. 6 is a longitudinal section taken on the line 6—6 of Fig. 5.
Figure 7:
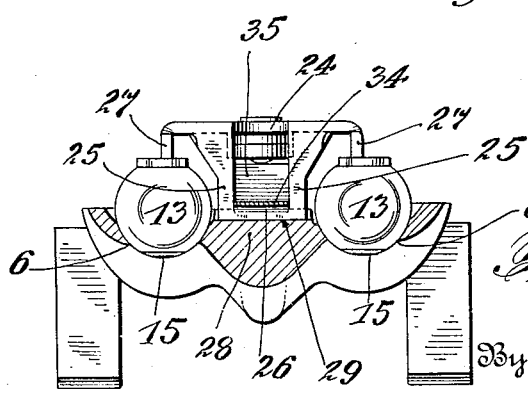
Fig. 7 is a transverse sectional view taken on the line 7—7 of Fig. 5.

In Figs. 5, 6 and 7 of the drawings, I have illustrated the use of my new method of attaching the glass eye members in connection with a different type of pendulum frame for the eye setting. In this case, the frame may consist of a rigid metal plate 24 having an angular part 25 at one end provided with an axis 26 which is adapted to be suitably mounted or attached to bearing means formed or provided upon the inner side of the front wall of a doll head. In laterally spaced relation from this axis 26, each side of the frame member 24 is formed with an arm 27 extending in parallel relation to the part 25 of the frame plate. The model head section 5' in this case is provided with an interiorly projecting part 28 on its wall between the spaced eye sockets which is formed with a transverse seat 29 in its end surface to receive the axis 26 of the eye setting. This part 28 of the head section 5 at one side of the seat 29 is formed with the spaced extensions or lugs indicated at 30.

To the inner surface of the wall of the head section 5 in line with each of the eye member receiving sockets a leaf spring 31 is attached having a free angularly extending end portion 32 curved to snugly bear against the surface of the eye member and yieldingly hold the same within the eye socket.

To one end of the head section 5 centrally thereof a longitudinally extending leaf spring 33 is secured. This spring is relatively long and adjacent its free end has a flattened part 34 adapted for bearing engagement upon the axis 26 of the eye setting frame to hold the same in position upon the seat 29. The extremity of this leaf spring is angularly extended from the part 34 as shown at 35.

In applying the frame of the eye setting, the axis 26 thereof is adapted to be engaged against the inclined end part 25 so as to force the end of the spring upwardly to the position indicated in dotted lines as the frame of the eye setting is arranged in position for attachment to the respective eye members.

In the last described construction, after the eye members have been accurately adjusted in the respective sockets as above explained, the frame of the eye setting is then positioned with its angular portion 25 bearing against the extensions 30 on the model head section 5′, and the axis 26 of said frame positioned beneath the part 34 of the spring 33. The frame is then moved downwardly so that the arms 27 thereof enter the rear open ends of the respective eye members and are imbedded in the cementitious material contained therein. This movement is continued until the axis 26 of the frame is seated in the seat 29 formed on the projection 28. After the material in the hollow eye members becomes hardened or set, the setting with the eye members attached may then be removed. In the manufactured doll heads, it will be understood that the bearing seat on the inner surface of the head wall which receives the axis 26 is in identically the same location with respect to the spaced eye openings and eye sockets of the head wall as in the model head section 5′ so that when this eye setting is subsequently mounted upon the wall of the manufactured doll head, the pupils of the spaced eye members will likewise occupy the same relation to the eye openings in the head wall as they did when initially adjusted with respect to the eye openings in the model doll head 5′ and attached to the spaced parts of the frame of the eye setting.

From the above description considered in connection with the accompanying drawings, it will be appreciated that by means of my new method of attaching the hollow glass eye members to the metal parts of the eye setting, this operation may be expeditiously performed by unskilled labor and with the highest degree of accuracy while the possibility of breaking the eye members in making subsequent adjustments, is entirely precluded. Thus, such glass eye members producing a highly realistic effect in the opening and closing movements of the eyes may be utilized in connection with dolls manufactered to sell at a comparatively low price since by means of the invention time and expense incident to the employment of highly skilled labor in the assemblage of the eye members with the metal parts of the eye setting and also loss due to breakage, is practically eliminated. I have described two different forms of the eye settings and embodiments of apparatus to be used in connection therewith in carrying out my new method, but it will be evident that this method might also be practically applied and used in connection with eye settings of various other mechanical forms. Accordingly, it is to be understood that in so far as the method and the essential features of the required apparatus is concerned, various alternative structural forms of the apparatus and of the eye settings may be utilized. Accordingly, I reserve the privilege of resorting to all such legitimate changes therein as may be fairly embodied within the spirit and scope of the invention as claimed.

I claim:

1. The method of attaching glass eye members to spaced parts of an oscillatory eye setting which consists in providing each of the eye members with an anchoring means and inserting said members in spaced eye openings of a model head section structurally identical with the front section of a doll head designed to receive the eye setting, adjusting the individual eye members until the pupils thereof are in centered relation with the respective eye openings, and then engaging spaced parts of a metal pendulum frame with the anchoring means of the respective eye members and securing said eye members in non-adjustable relation to said parts.

2. The method of attaching glass eye members to spaced parts of an oscillatory eye setting which consists in providing each of the eye members with an anchoring means and inserting said eye members into spaced sockets in the wall of a model head section structurally identical with the front section of a doll head designed to receive the eye setting, then separately adjusting the individual eye members to position the pupils thereon in centered relation with openings associated with the respective sockets while yieldingly urging the eye members into frictional engagement with the socket walls, and then engaging spaced parts of a metal pendulum frame with the anchoring means of the respective eye members to secure said members in non-adjustable relation to said parts.

3. The method of attaching hollow glass eye members open at their rear sides to spaced parts of an eye setting which consists in filling the interior of each eye member with a semi-plastic anchoring material and inserting said eye members into spaced sockets in the wall of a model head section structurally identical with the front section of a doll head designed to receive the eye setting, then separately adjusting said eye members to position the pupils thereon in centered relation with openings associated with the respective sockets while yieldingly urging the eye members into frictional contact with the socket walls, and then inserting spaced parts of a pendulum frame through the rear open sides of the eye members and embedding the same in the semi-plastic anchoring material to secure said eye members in fixed non-adjustable relation to said parts.

4. The method of attaching hollow glass eye members open at their rear sides to spaced parts of an eye setting which consists in filling the interior of each eye member with a semi-plastic anchoring material and inserting said eye members into spaced sockets in the wall of a model head section structurally identical with the front section of a doll head designed to receive the eye setting, then separately adjusting said eye members to position the pupils thereon in centered relation with openings associated with the respective sockets while yieldingly urging the eye members into frictional contact with the socket walls, and then inserting spaced parts of a pendulum frame through the rear open sides of said eye members and engaging an intermediate axis of the frame with a bearing seat on the head wall to thereby position said axis relative to the eye members and embed the spaced parts of the frame in the anchoring material whereby the eye members are secured in permanently fixed relation to said axis and to the parts of the frame.

5. In combination, a model head section structurally identical with the front section of a doll head designed to receive an oscillatory eye setting and having spaced eye openings and an eye member receiving socket associated with each of the openings, said sockets adapted to receive eye members to be attached to the frame of an oscillatory eye setting, and means secured to the model head structure yieldably holding said eye members with their surfaces in frictional contact with the walls of the eye sockets while permitting of the independent adjustment of said eye members to position the pupils thereon in centered relation to the respective eye openings.

6. In combination, a model head section structurally identical with the front section of a doll head designed to receive an oscillatory eye setting and having spaced eye openings and an eye member receiving socket associated with each of the openings, said sockets adapted to receive eye members to be attached to the frame of an oscillatory eye setting, and a resilient metal plate having its central portion fixed to the wall of said head structure and having relatively yieldable end portions spaced apart and bearing against the respective eye members to urge the same into frictional engagement with the walls of the eye sockets while permitting of the independent adjustment of said eye members to position the pupils thereon in centered relation with the respective eye openings.

7. Means for use in assembling the parts of doll eye settings comprising a model head section constituting a replica of the front section of a doll head designed to receive the eye setting and having spaced sockets adapted to removably receive artificial eye members each provided with an anchoring means, and means adapted to coact with each of said eye members and releasably hold the same in predetermined adjusted positions in the respective eye sockets while the spaced parts of a pendulum member are operatively engaged with said anchoring means whereby said eye members are permanently and non-adjustably connected to the pendulum members so that the pupils of the eye members will be positioned in accurately centered relation to the respective eye openings in the doll head wall when the setting is subsequently mounted and arranged in its operative position within the doll head.

In testimony that I claim the foregoing as my invention, I have signed my name hereto.

LEO J. GRUBMAN